United States Patent

Pruette et al.

[11] Patent Number: 5,725,621
[45] Date of Patent: Mar. 10, 1998

[54] FILTER END CAP ATTACHMENT

[75] Inventors: Dean Mac Pruette, Blacksburg, Va.; Allan Bradford Thomas, Charlotte, N.C.

[73] Assignee: Flair Corporation, Ocala, Fla.

[21] Appl. No.: 499,632

[22] Filed: Jul. 7, 1995

[51] Int. Cl.$^6$ .............. B01D 29/23; B01D 46/02
[52] U.S. Cl. .............. 55/377; 55/502; 55/507; 55/509; 210/238; 210/440; 210/444; 210/460
[58] Field of Search .............. 55/377, 490, 492, 55/498, 502, 505–509; 210/232, 238, 437, 440, 443, 444, 451–454, 460, 497.01, 497.2

[56] References Cited

U.S. PATENT DOCUMENTS

| | | | |
|---|---|---|---|
| 2,555,742 | 6/1951 | Grue | 55/507 X |
| 3,486,626 | 12/1969 | Close | 55/498 X |
| 3,672,130 | 6/1972 | Sullivan et al. | 55/509 X |
| 3,959,891 | 6/1976 | Burkall | 55/509 X |
| 4,073,632 | 2/1978 | Reinauer et al. | 55/507 X |
| 4,118,323 | 10/1978 | Sugiyama et al. | 55/498 X |
| 4,159,197 | 6/1979 | Schuler et al. | 55/507 X |
| 4,169,793 | 10/1979 | Lockshaw | 210/238 X |
| 4,204,960 | 5/1980 | Sugiyama et al. | 55/507 X |
| 4,482,367 | 11/1984 | Howeth | 55/498 X |
| 4,601,735 | 7/1986 | Morton, Jr. | 55/377 |
| 4,859,328 | 8/1989 | Groezinger et al. | 210/440 X |
| 4,865,738 | 9/1989 | Black, Jr. et al. | 55/492 X |
| 4,871,455 | 10/1989 | Terhune et al. | 55/507 X |
| 4,877,521 | 10/1989 | Petrucci et al. | 55/507 X |
| 4,976,759 | 12/1990 | Foltz | 55/498 X |
| 5,064,458 | 11/1991 | Machado | 55/498 X |
| 5,114,572 | 5/1992 | Hunter et al. | 55/502 X |
| 5,476,585 | 12/1995 | Mills | 55/502 X |

Primary Examiner—Robert Spitzer
Attorney, Agent, or Firm—Kennedy Covington Lobdell & Hickman LLP

[57] ABSTRACT

A filter system utilizing a coalescing-type filter element with an end cap which snap locks into a filter system. One embodiment includes elongated snap lock arms. Another embodiment includes shortened arms. A third embodiment includes a snap lock ring. The snap lock arms and the snap lock ring may include an extrusion for mating with a depression in the intake of the filter system. Alternatively, the snap lock arms and snap lock ring may include a depression for mating with an extrusion on the intake of the filter system. Further, the filter system may be arranged such that the end cap snap locks into an outlet of the filter system.

18 Claims, 4 Drawing Sheets

5,725,621

FILTER END CAP ATTACHMENT

BACKGROUND

The present invention generally relates to the filtration of a contaminated gas stream. More particularly, the present invention is directed toward a filter system utilizing a modular filter element having an end cap with snap lock arms for attaching the filter element to the filter system.

In order to decontaminate a gas stream, conventional filter systems utilize a filter element having a threaded end cap. Deficiencies exist with this conventional arrangement. First, there is difficulty attendant to threading a filter element into a filter system. The threads may not align properly, or because of poor machining tolerances may be difficult to properly thread. Second, threads in end caps may become stripped.

SUMMARY

The present invention alleviates the aforementioned deficiencies found in the prior art by providing a filter element of inexpensive construction which includes an end cap with snap lock arms for attaching the filter element into an inlet of the filter system.

The present invention is directed to a filter system utilizing a cylindrical filter element with a filter medium for filtering out contaminants from a gas stream. Such a system may include a filter tank, an intake pipe, an outlet pipe and a filter vessel within which a filter element is positioned. The filter element is used within the system in such a way as to allow for easy removal of the filter element for replacement or cleaning.

The filter element of the present invention includes, along with the filter medium, at least one end cap, and may include a filter drainage sleeve positioned outwardly from the medium. The filter element of the present invention also may incorporate a porous inner core located interior to the filter medium. Alternatively, or in addition, the filter element may include a porous outer core positioned either exterior to the filter medium or between the filter medium and the filter drainage sleeve.

An object of the present invention is to provide a filter system utilizing a coalescing-type filter element. Such a system may include a filter tank, an intake pipe, an outlet pipe and a filter vessel within which such a filter element is positioned. The coalescing-type filter element is constructed so as to snap lock into the filter system through snap lock arms on an end cap.

DETAILED DESCRIPTION OF THE PREFERRED EMBODIMENTS

Figure 1:
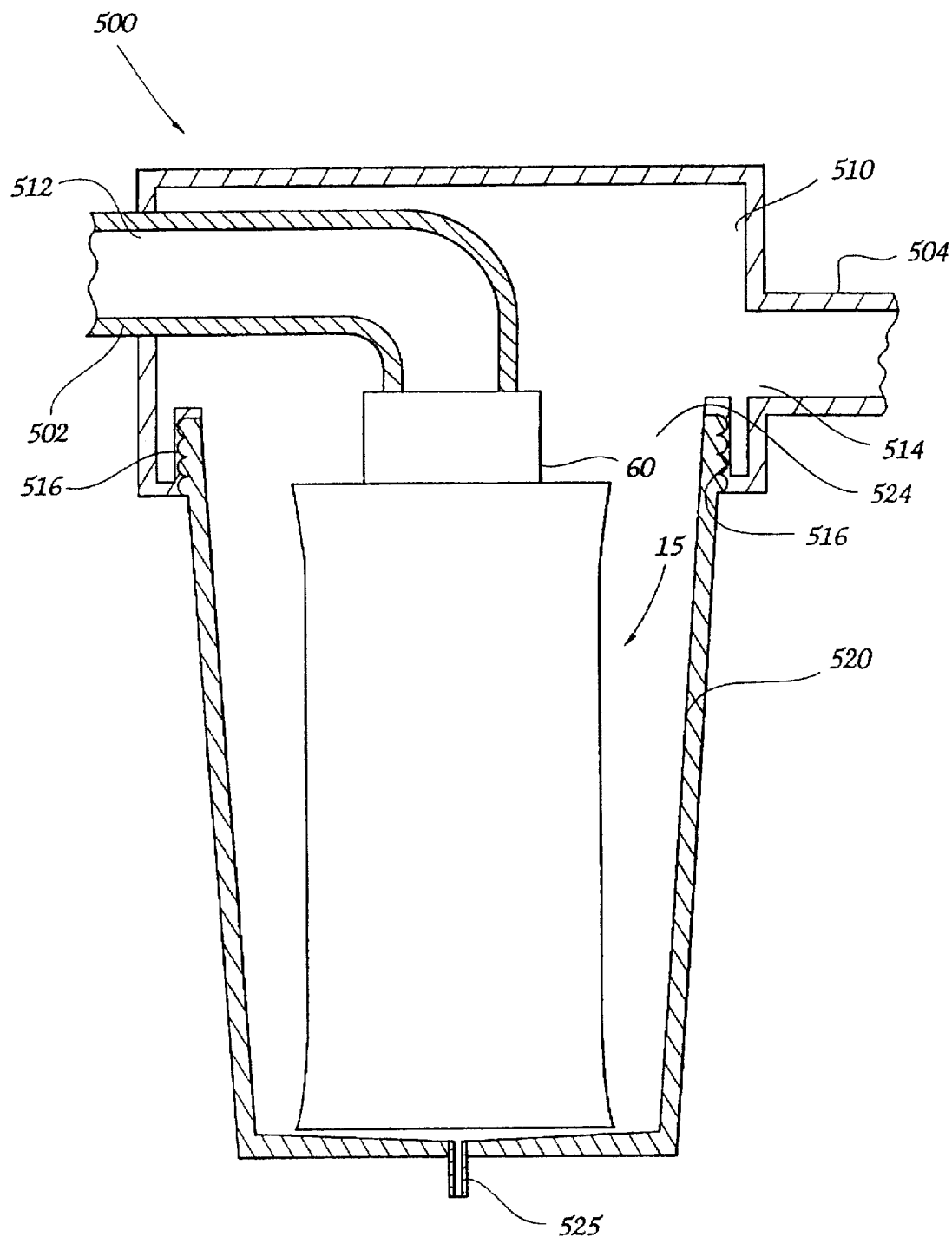
FIG. 1 is a partial cross-sectional view of a preferred embodiment of a filter system according to a preferred embodiment of the present invention.

Referring now to the drawings, where like numerals denote like elements, FIG. 1 shows a preferred embodiment of a filter element 15 within filter system 500. As shown in FIG. 1, filter element 15 includes a top cap 60 having a top cap stem 90. Further included in filter element 15 may be a filter drainage layer 50, having an outside surface 58. It is to be noted that any suitable mechanical bond or clamping mechanism may be utilized in attaching drainage layer 50 to a surface of top cap 60. Furthermore, it is to be noted that a chemical bond may be used in addition to or in lieu of a mechanical bond. The chemical bond may be any suitable adhesive composition, including epoxy, resin and glue.

Next will be described the configuration of a preferred embodiment of filter element 15. In addition to top cap 60 and filter drainage sleeve 50, discussed above, filter element 15 further includes a filter medium 30 located interior to drainage sleeve 50. Additionally, filter element 15 may include a porous inner core 20 or a porous outer core 40 or both. The cores 20, 40 both provide support to the filter element 15 as well as assist in filtering out contaminants from a gas stream. Inner core 20 has pores 21 and outer core 40 has pores 41. Both cores 20, 40 may be composed of a perforated material, such as perforated metal. Alternatively, the cores 20, 40 may be composed of a mesh-like material. Such a mesh-like material may be composed of any suitable material which would lend support to the filter element 15, such as reinforced plastic mesh and wire mesh.

Figure 2:
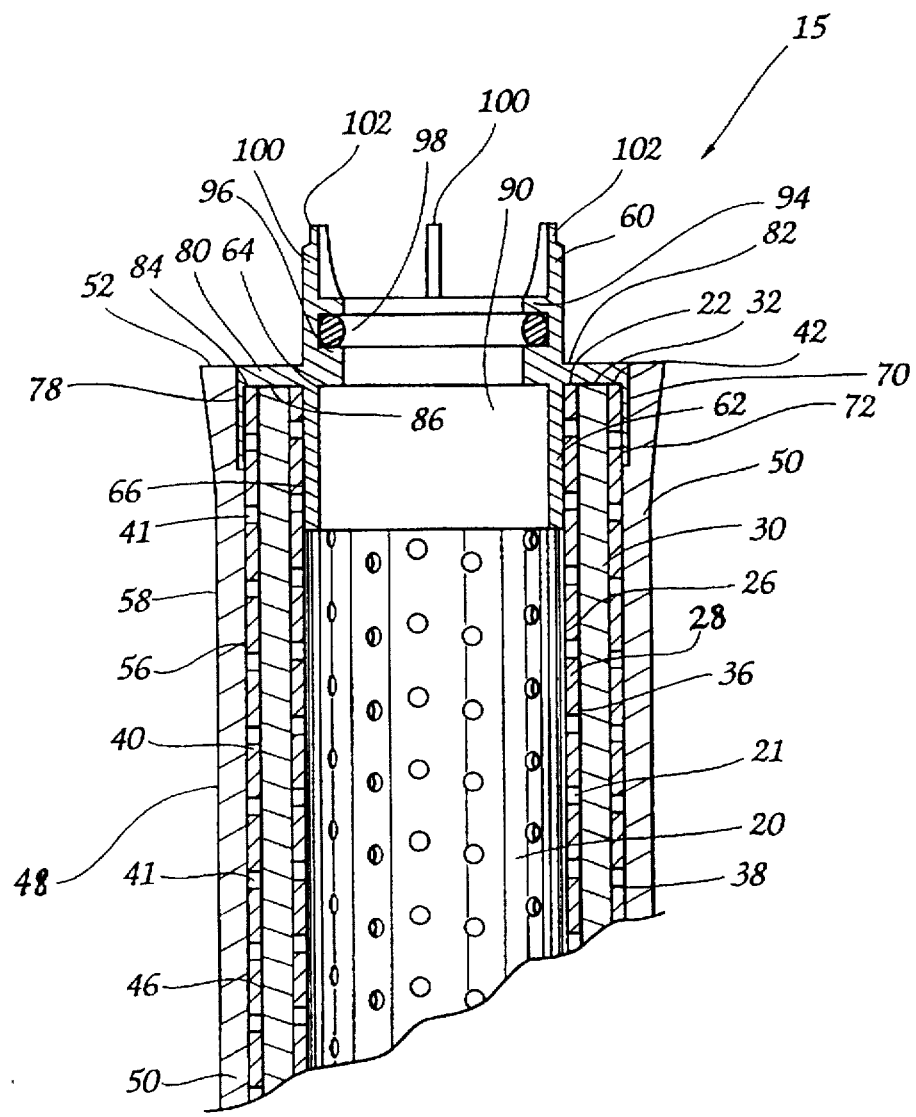
FIG. 2 is a cross-sectional partial view of the filter element of the system of FIG. 1.
Figure 3:
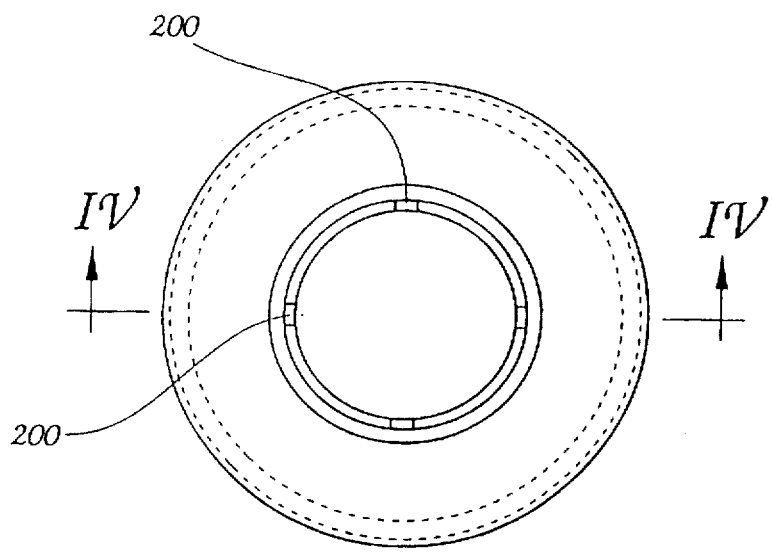
FIG. 3 is a view of the top of an end cap of a preferred embodiment of the filter element according to the present invention.

As shown in FIG. 2, the outer core 40, the filter medium 30 and the inner core 20 each have, respectively, top ends 42, 32, 22. Ends 22, 32, 42 are all substantially within the same plane and are adapted to receive a surface of top cap 60. Inner core 20 further includes an inside surface 26 and an outside surface 28. The inside surface 26 of inner core 20 is adjacent to and may abut a surface of top cap 60. Outside surface 28 of inner core 20 faces inside surface 36 of filter medium 30. Outer core 40 further has an inside surface 46 which faces outside surface 38 of filter medium 30. In addition, outer core 40 has an outside surface 48 which faces drainage layer inside surface 56.

Figure 5:
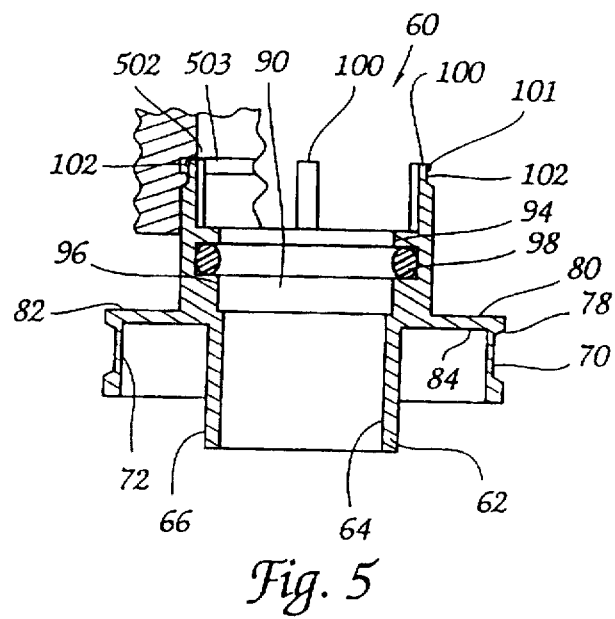
FIG. 5 is a view of another preferred embodiment of an end cap according to the present invention.

Next will be described in greater detail a preferred embodiment of top cap 60, as shown in FIGS. 2, 5. Top cap 60 includes an inner projection 62 and an outer projection 70. Inner projection 62 includes an inside surface 64 and an outside surface 66. Outside surface 66 faces inner core inside surface 26. Top cap outer projection 70 further includes an inside surface 72 and an outside surface 78. Inside surface 72 faces outer core outside surface 48.

Top cap portion 80 is located in a plane roughly perpendicular to projections 62, 70. Portion 80 includes an upper surface 82 and a lower surface 84. Lower surface 84 abuts top ends 22, 32, 42 of inner core 20, filter medium 30 and outer core 40. In addition, lower surface 84 may include surface ridges 86. Ridges 86 may enhance attachment of surface 84 of top cap 60 to top ends 22, 32, 42 through a chemical bond, such as epoxy, resin or glue applied thereon. Surface 82 of top cap portion 80 is roughly within the same plane as a filter drainage sleeve top end 52 of drainage sleeve 50.

Within top cap 60 may be found an upper shelf 94 and a lower shelf 96, between which may be positioned an O ring 98. Located throughout end cap 60 is an intake 90. Positioned at an upper end of top cap 60 are a number of elongated snap lock arms 100. Each arm 100 has an outwardly facing sloped surface 102. The sloped surfaces 102 assist in guiding the arms 100 into engagement with an intake pipe 502 of filter system 500 (described in greater detail below). In the most preferred embodiment, the number of arms 100 is four.

Each arm 100 may include an extrusion 101 on surface 102 (FIG. 5). Extrusions 101 snap fit into depression 503 positioned on an interior surface of intake pipe 502 (described in greater detail below). Alternatively, the extrusion 101 may be located on an interior surface of arms 100 and snap fit into depression 503 on an external surface of intake pipe 502. While the invention has been described in terms of the extrusions existing on arms 100 and the depressions on the pipe 502, it is to be understood that the extrusions can be on the pipe 502 and the depressions on the arms 100. Arms 100 may be formed of any suitable material. One such material is nylon reinforced with fiberglass.

FIG. 1 shows a preferred embodiment of a filter system 500 which utilizes a filter element 15. It is to be understood that any of the preferred embodiments of filter element 15 top cap 60, 160 (described in greater detail below) may be utilized within the filter system 500. Filter system 500 includes a filter system intake pipe 502, a filter system outlet pipe 504, a filter tank 510 and a filter vessel 520. Intake pipe 502 enters tank 510 at tank intake 512 and proceeds into filter element intake 90 (FIG. 2) of stem 90 within top cap 60. Filter system outlet pipe exits from filter system 500 at filter tank outlet 514.

Filter vessel 520 is attachable to and removable from filter tank 510. Filter vessel 520 creates a seal 516 between itself and filter tank 510 when properly attached. The seal 516 prevents the escape of the gas stream from the filter system 500. Vessel 520 also includes an outlet 524 into tank 510 to allow the gas stream exiting filter element 15 to flow into outlet pipe 504. Vessel 520 further includes a vessel drain 525 located at a bottom portion of vessel 520. As can be seen in FIG. 1, the lowest portion of vessel 520 may slope downwardly toward vessel drain 525. The drain 525 is positioned in order to allow contaminants which are filtered out of the gas stream to exit the filter system 500.

As a contaminated gas stream enters intake pipe 502, it proceeds into element 15, wherein the contaminants are extracted from the gas stream. The gas stream continues out the element 15 and out of vessel 520 and exits filter system 500 through outlet 504.

As shown in FIG. 1, the arrangement of the filter element 15 within filter system 500 is shown conventionally in that intake pipe 502 is shown in connection with top cap 60 and outlet 504 is shown in fluid connection with fluid vessel 520. Alternatively, top cap 60 may be connected to outlet 504 and intake pipe 502 may be in fluid connection with vessel 520. Thus, a contaminated gas stream may enter intake pipe 502, proceed into vessel 520 and enter into element 15. As the gas stream is decontaminated by element 15, the cleaned gas stream exits from top cap 60 and exits the filter system 500 through outlet 504.

Figure 4:
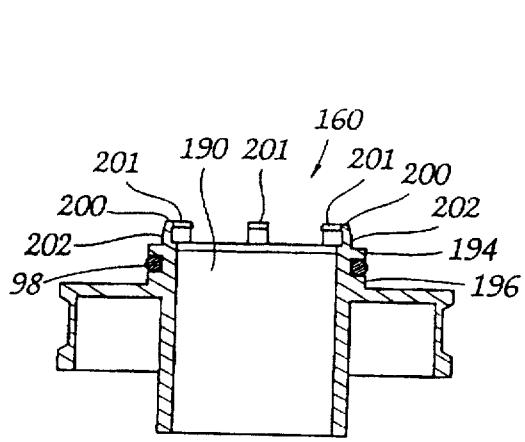
FIG. 4 is a view taken along section line IV—IV of FIG. 3.

With reference to FIG. 4, next will be described another preferred embodiment of a top cap of filter element 15. As shown in FIG. 4, top cap 160 has an intake 190. Unlike top cap 60, which includes elongated snap lock arms 100 attachable to intake pipe 502 of filter system 500, top cap 160 has a number of shortened top cap arms 200. Arms 200, which may be formed of any suitable materials such as nylon reinforced with fiberglass, may have a sloped surface 202 for assisting in fitting the end cap into intake pipe 502. Arms 200 extend upwardly from top cap 160 and snap lock into intake pipe 502, thus attaching filter element 15 to the filter system 500. In the most preferred embodiment, the number of arms 200 is four. Top cap 160 may further include outwardly positioned upper and lower shelves 194, 196, between which may be positioned an O ring 98.

Arms 200 further may include extrusions 201 for snap fitting into depressions 503 in pipe intake 502. The arrangement of extrusions and depressions is the same for arms 200 as described for arms 100 above. As shown in FIG. 4, extrusions 201 are positioned on an interior surface of arms 200, for reciprocation with depressions 503 in pipe 502 (not shown).

Figure 6:
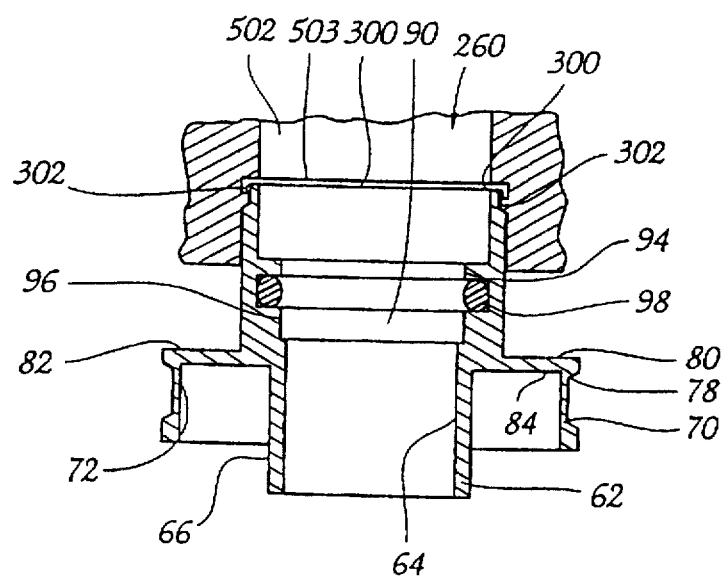
FIG. 6 is a view of another preferred embodiment of an end cap according to the present invention.

With reference to FIG. 6, next will be described another preferred embodiment of a top cap of filter element 15. As shown in FIG. 6, top cap 260 is similar in design to top cap 60, 160; however, in place of arms 100, 200 is a singular ring 300. Ring 300 may be formed of any suitable material, such as nylon reinforced with fiberglass. Ring 300 may include an extrusion 302 positioned outwardly such that it may snap fit into depression 503 in intake pipe 502. As with top cap 60, 160, extrusion 302 may be positioned inwardly such that it may snap fit into depression 503 located exteriorly on intake pipe 502. Furthermore, the extrusion/depression arrangement may be such that the extrusion is positioned on intake pipe 502 and the depression is positioned on ring 300.

The above description and drawings are merely illustrative of a preferred embodiment which achieves the objects, features and advantages of the present invention. It is not intended that the present invention be limited thereto. Any modification of the present invention which comes within the spirit and scope of the following claims is considered part of the present invention. It is to be understood that the scope of the present invention encompasses all orientations wherein the present invention functions.

What is new and desired to be protected by Letters Patent of the United States is:

1. A filter element for use in a filter system having at least one conduit, comprising:
   a porous inner core;
   a filter medium positioned exterior to said inner core; and
   a first end cap, said end cap having a body portion and a plurality of engagement portions formed integrally with said body and projecting away therefrom, said plurality of engagement portions having sufficient resiliency to allow engagement between said plurality of engagement portions and said at least one conduit to provide the sole support for said filter element within said filter system.

2. The filter element as recited in claim 1, wherein each of said plurality of engagement portions includes an extrusion.

3. The filter element as recited in claim 1, further comprising a second end cap.

4. The filter element as recited in claim 1, further comprising a porous outer core positioned exterior to said filter medium.

5. The filter element as recited in claim 1, wherein said plurality of engagement portions is four engagement portions.

6. A filter element for use in a filter system having at least one conduit, comprising:
   a porous inner core;
   a filter medium positioned exterior to said inner core; and
   a first end cap, said end cap having a body portion and a snap lock ring formed integrally with said body and having sufficient resiliency to allow engagement between said ring and said at least one conduit to provide the sole support for said filter element within said filter system.

7. The filter element as recited in claim 6, wherein said snap lock ring includes an extrusion.

8. A filter element for use in a filter system having at least one conduit, comprising:

a porous outer core;

a filter medium positioned interior to said outer core; and a first end cap, said end cap having a body portion and a plurality of engagement portions formed integrally with said body and projecting away therefrom, said plurality of engagement portions having sufficient resiliency to allow engagement between said plurality of engagement portions and said at least one conduit to provide the sole support for said filter element within said filter system.

9. The filter element as recited in claim 8, wherein each of said plurality of engagement portions includes an extrusion.

10. The filter element as recited in claim 8, further comprising a second end cap.

11. The filter element as recited in claim 8, wherein said plurality of engagement portions is four engagement portions.

12. A filter element for use in a filter system having at least one conduit, comprising:

a porous outer core;

a filter medium positioned interior to said outer core; and a first end cap, said end cap having a body portion and a snap lock ring formed integrally with said body and having sufficient resiliency to allow engagement between said ring and said at least one conduit to provide the sole support for said filter element within said filter system.

13. The filter element as recited in claim 12, wherein said snap lock ring includes an extrusion.

14. A filter element for use in a filter system having at least one conduit, comprising:

a porous inner core;

a porous outer core;

a filter medium positioned exterior to said inner core;

a first end cap, said end cap having a body portion and four engagement portions formed integrally with said body and projecting away therefrom, said four engagement portions having sufficient resiliency to allow engagement between said four engagement portions and said at least one conduit to provide the sole support for said filter element within said filter system, wherein each of said four engagement portions includes an extrusion; and a second end cap.

15. A filter element for use in a filter system having at least one conduit, comprising:

a porous inner core;

a porous outer core;

a filter medium positioned exterior to said inner core; and a first end cap, said end cap having a body portion and a snap lock ring formed integrally with said body and having sufficient resiliency to allow engagement between said ring and said at least one conduit to provide the sole support for said filter element within said filter system, wherein said snap lock ring includes an extrusion; and a second end cap.

16. A filter system comprising:

a filter element, said element including a porous inner core, a filter medium positioned exterior to said inner core and a first end cap, said end cap having a body portion and a plurality of engagement portions formed integrally with said body and projecting away therefrom;

an intake, said intake in connection with said engagement portions to provide the sole support for said filter element within said filter system;

an outlet; and a filter vessel for housing said filter element.

17. The filter system as recited in claim 16, wherein said intake further includes a depression and each said engagement portion includes an extrusion, said extrusions to mate with said depression.

18. A filter system comprising:

a filter element, said element including a porous inner core, a filter medium positioned exterior to said inner core and a first end cap, said end cap having a body portion and a snap lock ring formed integrally with said body;

an intake, said intake in connection with said snap lock ring to provide the sole support for said filter element within said filter system;

an outlet; and a filter vessel for housing said filter element.

* * * * *